United States Patent Office 3,407,912
Patented Oct. 29, 1968

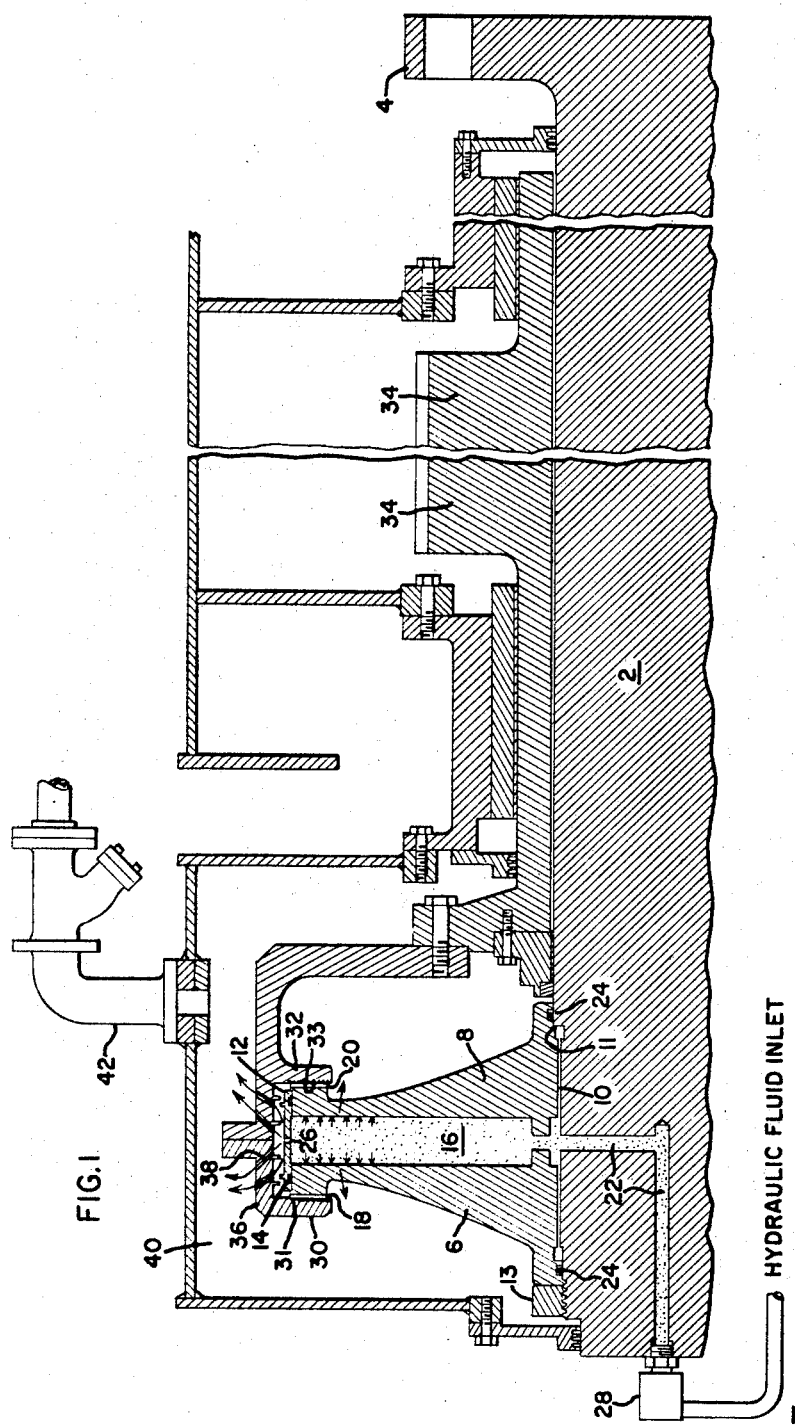

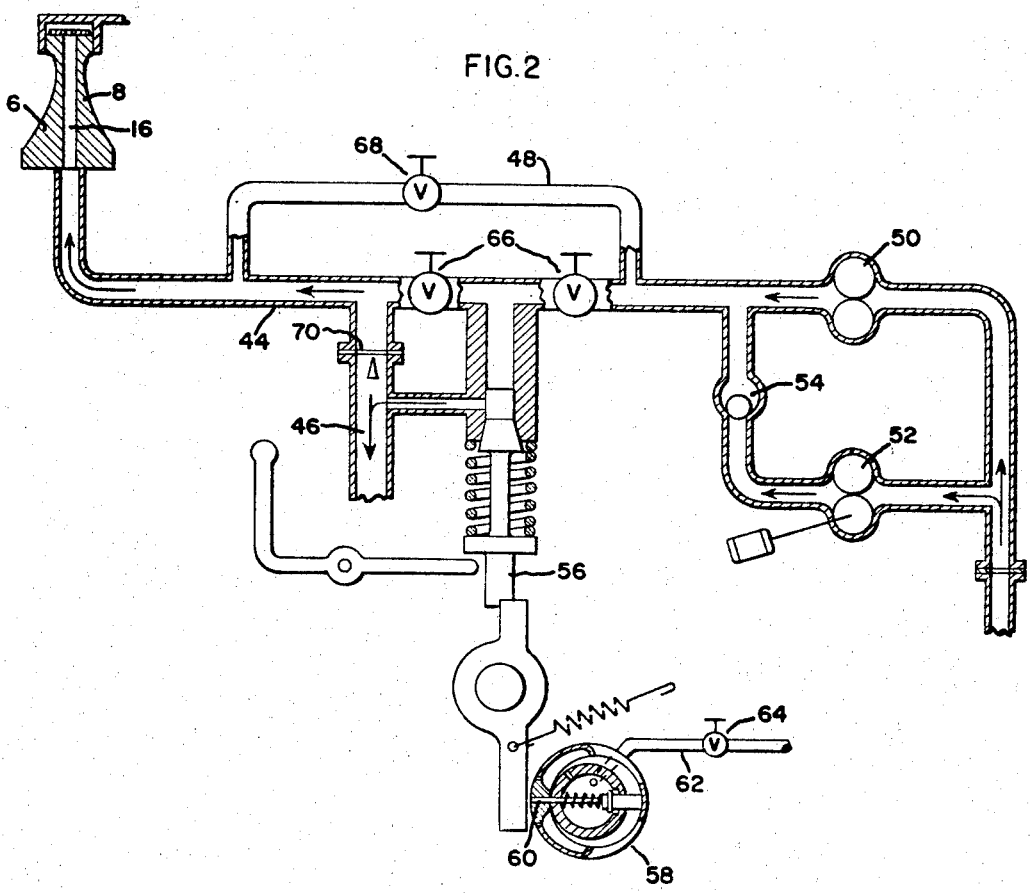

3,407,912
OVER-SPEED RELEASED FLUID
OPERATED CLUTCH
Marshall G. Moore, Danvers, Mass., assignor to General
Electric Company, a corporation of New York
Filed Sept. 15, 1966, Ser. No. 579,558
3 Claims. (Cl. 192—88)

ABSTRACT OF THE DISCLOSURE

A speed sensitive hydraulic disconnect coupling having alternate hydraulic pressure sources and parallel hydraulic relief devices, one pressure responsive and one speed responsive, to effect disconnection.

---

This invention relates generally to mechanical couplings for transmission of torque from a driving to a driven member. More particularly, it relates to a speed sensitive coupling which is responsive to overspeed of a driving member to disconnect it from its driven member.

One environment, though by no means the only one, for the present invention is in the drive coupling connecting the turbine and generator of a hydroelectric plant. In a hydroelectric powerplant, if overspeeding develops, it is desirable to disconnect the turbine from the generator. This is because, due to inherent design characteristics, overspeed becomes a more limiting consideration as to the generator than as to the turbine, and a means to protect the generator is desirable.

Accordingly, one object of the present invention is to provide a speed-responsive disconnect coupling which is effective to disconnect a driven from a driving member at a predetermined level of overspeed.

Another object is to provide such a speed responsive disconnect coupling having an operating mechanism which can be tested periodically without disconnecting the coupling.

Another object is to provide a disconnect coupling for a hydraulic turbine-generator which will allow the driven generator to be disconnected from its turbine and used as a synchronous condenser for power factor correction when it is not needed for generation or when water is scarce.

Other objects, advantages and features of the present invention will become apparent from the following description of one embodiment thereof, when taken in connection with the accompanying drawing.

Briefly stated, the present invention is practiced in one form by a pair of coaxial friction-faced disc spring elements, splined to a generator shaft. There is a pressure chamber between the opposed faces of the discs, and a pressurized fluid urges the discs apart into frictional drive relationship with friction elements which are mounted rotatable with a driving member. A positive displacement pump which is direct-driven from the same driving member, maintains pressure within the pressure space between the friction discs. Upon overspeed, an emergency governor actuates a dump valve which dumps hydraulic fluid from the discharge side of the shaft-driven pump so as to relieve the pressure urging the discs into driving relationship, thereby allowing the disc springs to relax, disengaging the coupling.

In the drawing:

FIG. 1 is a longitudinal elevation, partly in section, of the disconnect coupling of the present invention, and FIG. 2 is a schematic diagram of the control or operator system of the disconnect coupling showin in FIG. 1.

Referring now to FIG. 1, there is shown a shaft 2 which is an extension of a generator shaft, and mounted on a generator shaft by a flange 4 on one of its ends. A pair of disc spring elements 6 and 8 are mounted on shaft 2 and are nonrotatable relative thereto by means of a spline 10 or other anchor means. Disc spring elements are also fixed against axial movement by a shoulder 11 on shaft 2 abutting disc spring 8, and by a nut 13 threaded on shaft 2 against disc spring 6. Thus disc springs 6 and 8 are cantilevered at their centers.

Around the radially outermost parts of discs 6 and 8, is a sealing means 12, mounted by O rings 14 relative to discs 6 and 8, and which together with discs 6 and 8 define a pressure chamber 16. Disc spring 6 has a knurled copper face 18, and disc spring 8 has a knurled copper face 20, which faces are oppositely directed away from the chamber 16 in an axial direction. Shaft 2 defines a hydraulic passage 22 which communicates with pressure chamber 16. The juncture of hydraulic passage 22 and pressure chamber 16 is suitably sealed by O rings or other means 24. Sealing member 12 defines an orifice 26 therethrough. Hydraulic passage 22, which is within the rotating shaft 2, communicates with external stationary hydraulic conduit by means of a rotating hydraulic seal 28 of a known type.

A pair of oppositely-faced knurled steel rings or friction elements 30 and 32 are mounted in the form of a yoke surrounding the discs 6 and 8. The rings 30 and 32 are fixed to a pinion 34 which is driven by a hydraulic turbine, not shown. Rings 30 and 32 are knurled in their face plate portions 31 and 33. The yoke 36 defines flow passages 38 through which pressure chamber 16 communicates ultimately with the interior of a hydraulic fluid collection chamber 40. Collection chamber 40 drains through a sediment strainer 42 and into a hydraulic fluid reservoir, not shown.

FIG. 2 shows a schematic of the hydraulic system leading up to pressure chamber 16. The piping of the hydraulic control system shown in FIG. 2 comprises a pressure line 44, a dump line 46, and a bypass line 48. A positive displacement hydraulic pump 50, directly driven off the shaft of pinion 34 or by a common driver; and a motor-driven hydraulic pump 52 are arranged in parallel relationship in pressure line 44. A one-way check valve 54, downstream of motor-driven pump 52, prevents back flow through pump 52 when it is idle. Downstream of pumps 50 and 52 is a dump valve 56 communicating with the pressure line 44 and with dump line 46. Dump valve 56 is actuated by a conventional emergency governor 58, which is of the "off center bolt" type and includes a member 60 held in a retracted position by a spring and which is actuated by centrifugal force against the spring upon overspeed to trip the dump valve 56. Emergency governor 58 is also manually operable by the insertion therein of a small quantity of oil which triggers the governor action at a speed below that at which it is set to function. For this purpose, an oil line 62 having a valve 64 is provided. Isolation valves 66 appear in pressure line 44 on both the upstream and downstream sides of dump valve 56. Bypass line 48 has a bypass valve 68 therein.

Dump line 46 contains a blowout diaphragm 70 which is calibrated or designed to rupture at a hydraulic pressure from shaft driven pump 50 corresponding to a speed substantially above the speed at which the emergency governor will normally operate, for example, 130% of rated speed.

The operation of the above-described speed responsive disconnect coupling will now be given. In normal operation, isolation valves 66 are open and bypass valve 68 is closed. During startup of the turbine-generator, motor-driven pump 52 pressurizes hydraulic line 44 and pressure chamber 16 so as to urge the flexible disc springs 6 and 8 apart. The knurled copper faces on the disc springs are thus frictionally engaged with the knurled steel faces on steel rings 30 and 32. After the unit is at speed, pump 52 may be shut down and shaft driven pump 50 maintains pressure in chamber 16. During operation, if an overspeed in the turbine should develop, emergency governor 58 will actuate the dump valve 56 releasing the hydraulic fluid from chamber 16 and pressure line 44 through the dump line 46. The disc springs 6 and 8 relax to their normally unflexed position and the generator shaft is disconnected from the turbine. The softer copper members will absorb all the wear and they alone might require replacement after use.

The blowout diaphragm 70 is a reliability feature. If the emergency governor failed to operate at its preset position as, for example, 120% of rated speed, the blowout diaphragm would rupture at a predetermined higher speed as, for instance, 130% of rated speed due to the correspondingly increased pressure from the positive displacement pump 50. This would cause the same dumping through line 46 to relieve pressure and effect the disconnect of turbine and generator.

The pumps 50 and 52 in the hydraulic system are positive displacement pumps and continuous flow is provided for in orifice 26 and passages 38 into the fluid collecting chamber 40, the orifice 26 also serving to maintain the required back pressure in chamber 16. The hydraulic fluid, which may be the regular lubricating oil for the sake of simplicity, is then recirculated to its reservoir through a sediment strainer 42. When the turbine and generator are up to speed, hydraulic pump 50, being driven by the prime mover, is adequate to deliver the required hydraulic pressure. Thus, motor-driven pump 52 is no longer required and can be shut off, the one-way check valve 54 preventing back flow therethrough.

Since this disconnect coupling is likely to be seldom if at all used in an emergency, it is desired to test and exercise its operation periodically. For this purpose, bypass valve 68 is opened permitting continuous maintenance of pressure in chamber 16, the isolation valves 66 then being closed. Closing the isolation valves enables the dump valve 56 to be operated without losing hydraulic pressure in chamber 16. In this condition then, dump valve 56 is actuated by the emergency governor 58 which is actuable at any desired speed as, for example, rated speed, by the introduction therein of a given amount of oil through valve 64 in line 62. In other words, assuming the turbine and generator to be running at rated speed, the hydraulic dump arrangement can nevertheless be tested by isolating the dump valve and causing the emergency governor to actuate it by the introduction into the governor of an amount of oil which actuates the off center bolt mechanism. The turbine and generator can be disconnected at any speed by simply leaving the isolation valves 66 open and tripping the dump valve by introducing oil into the emergency governor. This might be desirable if the generator is not needed for generation and is available for use as a synchronous condenser.

Various protective features may be built into the above-described system. For example, bypass valve 68 could be of the type requiring a manual hold-open. Similarly, it might be desirable to provide isolation valves 66 with a manual hold-close. These features would prevent valves 66 and 68 from being left in any position other than their normal operating position. Another reliability feature which may be added to the hydraulic control system would be to have the reset mechanism for the dump valve interlocked with a zero speed device or the turning gear so that the governor could be reset only at standstill or on turning gear.

Thus, it will be appreciated that a novel disconnect coupling has been herein described which is effective to disconnect a driving from a driven member upon overspeed. Furthermore, the combination of the novel disconnect coupling with additional controls has resulted in a novel combination of disconnect coupling and operator which is capable of being periodically tested and exercised, and is thus reliable.

It may occur to others of ordinary skill in the art to make modifications of the present invention which will lie within the concept and scope thereof and will not constitute departure therefrom. For example, it is possible, though not presently preferred, to have disc springs 6 and 8 axially slidable along spline 10 on shaft 2 so that there would be displacement of each disc in its entirety instead of the presently preferred flexure. Furthermore, the invention would find equal applicability whether a turbine and generator are direct-connected or if a speed increase is involved. Accordingly, it is intended that the present invention be not limited by the details in which it has been described but that it encompass all within the purview of the following claims.

What is claimed is:

1. A speed-responsive disconnect coupling for transmission of torque from one rotatable member to another, comprising:
   a pair of disc springs non-rotatably mounted relative to one of said members and separated by an expansion chamber, the faces of said discs opposite said chamber being of a relatively soft friction material,
   a pair of friction elements non-rotatably mounted relative to the other of said members and coaxial with said disc springs, each of said friction elements displaced axially relative to one of said discs on the side thereof opposite said expansion chamber, and each of said friction elements having friction faces of relatively hard material corresponding to the faces of said discs,
   a stationary pressure conduit, and a rotating seal to permit communication of said stationary pressure conduit with said rotating expansion chamber,
   a hydraulic pump operatively connected to one of said members and responsive to the speed thereof, and discharging into said pressure conduit,
   a second hydraulic pump independent of said members and also discharging into said pressure conduit,
   a governor-actuated dump valve in communication with said pressure conduit,
   a speed responsive governor to actuate said dump valve, and
   a pressure responsive dump means disposed in communication with said pressure conduit.

2. A speed responsive disconnect coupling according to claim 1, further comprising means to place said dump valve out of hydraulic communication with said pressure conduit while maintaining communication between said pumps and said expansion chamber.

3. A speed responsive disconnect coupling according to claim 1 in which said pressure responsive dump means includes a rupture disc.

References Cited

UNITED STATES PATENTS

| | | |
|---|---|---|
| 1,137,944 | 5/1915 | Allen. |
| 2,301,930 | 11/1942 | Cattaneo _____ 192—103 |
| 3,005,529 | 10/1961 | Bochan. |
| 2,619,212 | 11/1952 | Cardwell et al. |
| 2,642,972 | 6/1953 | Brooks _____ 192—104 |
| 3,155,040 | 11/1964 | Shurts et al. |
| 3,324,983 | 6/1967 | Snoy et al. _____ 192—194 |

BENJAMIN W. WYCHE III, *Primary Examiner.*